United States Patent [19]
Itonaga et al.

[11] Patent Number: 5,636,056
[45] Date of Patent: Jun. 3, 1997

[54] DEVICE FOR PREVENTING SIGNAL LAMPS FROM PRESENTING FALSE LIGHTING PHENOMENON

[75] Inventors: Takashi Itonaga; Toshio Tomosada, both of Oomuta, Japan

[73] Assignee: Singoh Denzai Kabushiki Kaisha, Fukuoka, Japan

[21] Appl. No.: 356,355

[22] PCT Filed: Jul. 2, 1993

[86] PCT No.: PCT/JP93/00913

§ 371 Date: Dec. 20, 1994

§ 102(e) Date: Dec. 20, 1994

[87] PCT Pub. No.: WO94/01848

PCT Pub. Date: Jan. 20, 1994

[30] Foreign Application Priority Data

Jul. 2, 1992 [JP] Japan ................... 4-199186

[51] Int. Cl.[6] .............. G02B 27/00; G02B 5/08; G02B 17/00
[52] U.S. Cl. ........... 359/601; 359/602; 359/603; 359/604; 359/608; 359/618; 359/619; 359/623; 359/620
[58] Field of Search .................... 359/601, 602, 359/603, 604, 608, 618, 619, 623, 620, 621

[56] References Cited

U.S. PATENT DOCUMENTS

| | | |
|---|---|---|
| 3,598,475 | 8/1971 | Lewis et al. .................. 359/665 |
| 4,650,287 | 3/1987 | Kudo et al. ................... 359/601 |
| 4,652,851 | 3/1987 | Lewin ........................ 340/22 |
| 4,758,074 | 7/1988 | Yamakawa .................... 359/650 |
| 5,056,912 | 10/1991 | Hamada et al. ................ 353/38 |
| 5,155,005 | 10/1992 | Sato et al. ................... 430/257 |

FOREIGN PATENT DOCUMENTS

| | | | |
|---|---|---|---|
| 188010 | 11/1982 | Japan | 359/619 |
| 198024 | 8/1991 | Japan | 359/619 |

*Primary Examiner*—Paul M. Dzierzynski
*Assistant Examiner*—Mohammad Y. Sikder
*Attorney, Agent, or Firm*—Jordan and Hamburg

[57] ABSTRACT

A device for preventing a false lighting phenomenon is provided between a light source of the main body of a signal lamp and e cover lens for preventing the signal lamp from presenting a false lighting phenomenon. The device for preventing a false lighting phenomenon comprises a pair of complex spherical lenses formed by many numbers of spheres arranged in a matrix on planes, and configured in a chain form in which the contact points, front, rear, left and right sides, of each of the spheres truncate the spheres forming a gapless interface while the upper and lower spherical surfaces are left intact to function as spherical lenses. A shielding element is interposed between the pair of complex spherical lenses and has light transmitting slits for receiving each lens surface of the spherical lenses from corresponding sides to function as a spacer for positioning the focuses of the spherical lenses on one side in the vicinity of the vertices of the corresponding lens surfaces of spherical lenses on the other side.

45 Claims, 13 Drawing Sheets

DEVICE FOR PREVENTING SIGNAL LAMPS FROM PRESENTING FALSE LIGHTING PHENOMENON

BACKGROUND OF THE INVENTION

This invention relates to a device for preventing signal lamps from presenting a false lighting phenomenon caused by sun light, particularly from the rising sun and setting sun so that the on and off state of the signals lamps can be determined more distinctly.

In the automobile based society, the role of traffic lights is extremely important in order to control traffic smoothly. The state of traffic lights must be reliably recognizable by a driver under any circumstances.

As is well known, traffic lights are of a self-emissive type using electric bulbs. Therefore, if an ambient brightness is low, relative luminance of traffic lights is high, making the lighting state reliably recognizable, but if the surroundings are considerably bright, the relative luminance is low, making it difficult for an observer to recognize the state reliably in situations such as when the sun shines directly on surface of the traffic lights. In other words, if the sun is in a lower position as it rises or sets, the sun light is incident upon the interior of the signal lamps and reflected, thus presenting a condition that the states of the traffic lights are misidentified as being on. This is the so-called false lighting phenomenon, presents a problem that must be solved with respect to the signal lamps.

As a means for solving a false lighting phenomenon of the kind, there is known a shielding lens used for the signal lamps such as disclosed in Japanese Unexamined Utility Model Publication No. Hei-3-54100. This prior art has many cylindrical condenser lens elements having a given curvature arranged on a reverse side of lenses formed in a translucent material, and at the same time, there are formed on a front surface side of the translucent lenses diffuse lenses having converging sections forming a light transmission section corresponding to condenser lens elements. The shielding lenses have shielding films coated between the diffuse lenses and the front lenses of the signal lamps and the light sources. In other words, while the light from the electric bulb serving as the light source is condensed by the condenser lens elements for irradiation, the sun light is diffused in the interior of the signal lamps by the diffuse lenses and is also shielded by use of the shielding films in order to prevent the false lighting from taking place.

Nevertheless, in the shielding lens, when the sun light is radiant right in front of the signal lamps while the signal lamps are turned off, sun light incident upon the interior of the diffuse lens elements continuously arranged on a concave surface is allowed by the shielding element to enter the interior or the signal lamps in a straight line. Then, after the sun light is reflected by the reflection mirror in the signal lamp, it is again radiated through the condenser lens elements. As a result, a false lighting phenomenon takes place, and at the same time, the surface reflection occurs on the surface of the diffuse lens elements. Thus, due to the synergistic effect of the false lightning phenomenon, it becomes difficult to identify the on and off state of the lights. Consequently, when the sun light is incident upon the shielding lenses at a certain angle, the disclosed example demonstrates an excellent effect in preventing a false lighting phenomenon, but there is still a problem that it is difficult to prevent a false lighting phenomenon from taking place when the sun light is incident upon the front of the signal lamps at the time of the sun rise, sun set, and the like.

In short, for the prevention of a false lighting phenomenon, various improvements have been attempted, but under the present circumstances, heretofore there are no signal lamps capable of effectively solving the problem of a false lighting phenomenon because of the conflicting functions required: whereas the sun light, an external light, should be cut off as much as possible, the inner light from the internal light source should be emitted as effectively as possible.

Therefore, it is an objective of this invention to provide a device capable of emitting the inner light as effectively as possible while shielding the sun light as much as possible for preventing signal lamps from presenting a false lighting phenomenon.

SUMMARY OF THE INVENTION

A device for preventing a false lighting phenomenon according to the present invention, which is arranged between a light source in the main body or a signal lamp and a cover lens to present the signal lamps from presenting a false lighting phenomenon, to present as its primary feature a pair of complex spherical lenses formed by spheres arranged in matrices on planes, and in a chain form in which contact points, front, rear, left, and right sides, of each of the spheres are disposed abutting each other compressing the spheres to remove gaps while the upper and lower spherical surfaces are left intact so that the upper and lower spherical surfaces function as the spherical lenses. A shielding element serves as a spacer intervening between the pair of complex spherical lenses and has light transmitting holes therein which receive each lens surface of the spherical lenses from the corresponding sides, positioning focuses of the spherical lenses on one side in the vicinity of the vertices of the lens surfaces of the spherical lenses on the other side where the lens surfaces of the spherical lenses are received in the light transmitting holes.

According to an embodiment of the present invention for preventing a false lighting phenomenon, the directly radiated beam of the sun is at first refracted by each of the spherical lenses of the complex spherical lenses on the cover lens side (external side) even when it is incident upon them directly from the front, thus focusing the light in the light transmitting holes of the shielding element so that it is condensed to be extremely small, and then, refracted again by the spherical lenses of the complex spherical lenses on the light source side (internal side) of the signal lamps, resulting in the sun light entering in a state that it is diffused. In this way, since the sun light is incident in a diffused state, the reflected light is reduced when it is reflected in the signal lamps and emitted therefrom. At the same time, the reflected light is cut off by the shielding element. Therefore, the contrast of brightness becomes greater in the interior and exterior of the signal lamps. In this respect, there exists the sun light reflected on the outer surface of the complex spherical lenses on the outer side, though its surface reflection is extremely limited. However, there is no flat portion associated with the surface of the complex spherical lenses. The surface is a collective element of convex surfaces configured substantially hemispheric, hence making it possible to reflect it after being greatly diffused. As a result, its luminance is made extremely small.

On the other hand, when the light source is turned on in the signal lamp having the device of the present invention, the light beam from the light source is refracted by each of the spherical lenses of the complex spherical lenses on the internal side so that it is focused in the light transmitting holes, thus being condensed to be extremely small. Then, the light beam is in a state that it is emitted while being refracted and expanded through each of the spherical lenses of the complex spherical lenses on the external side. As a result, it is possible to obtain good visibility from the outside without observing any shadow of the shielding element.

The complex spherical lenses of a device for preventing a false lighting phenomenon can be formed of an acrylic resin without any problem. In other words, if more considerations should be given to the apparatus with respect to the economy and weight, the acrylic resin is suitably used because of its light weight and excellent workability. If the transmittance should be considered more important, a glass material is used. Also, if the shielding element is prepared from by a metallic board having light transmitting holes made by a punching, it is possible to obtain a shielding element having a good workability and a higher strength as well. The interior of the signal lamp provided with the device of the present invention for preventing a false lighting phenomenon is heated to a temperature of as high as 120° C. at the maximum due to the heat generated by the light source when it is turned on. However, with the provision of a shielding element of the kind which is disposed between the complex spherical lenses and formed integrally with them, it is possible to obtain a strength sufficient to withstand such a high temperature, while preventing the focus of each spherical lens or the complex spherical lenses from deviating. Further, it is preferable that the inner sides of the light transmitting holes and/or the faces other than the light transmitting holes of the shielding element be colored black or similar because with this coloring arrangement, an excellent shielding capability is obtained.

Furthermore, if a mirror section is provided on the inner side of each of the light transmitting holes the light source side of the signal lamp, the light beam from the light source is amplified by the reflection from each mirror section so that the luminance is further enhanced. In this case, compared to the one having no mirror sections, the light beam is converged so that its visual angle can be controlled. Therefore, it becomes more convenient to adopt such signal lamps at an intersection where crossing angles are narrower.

According to another feature of the present invention for preventing a false lighting phenomenon includes providing between a light source in the main body of a signal lamp and a cover lens preventing the signal lamp from presenting a false lighting phenomenon, is a pair of complex spherical lenses formed by spheres arranged in matrices on planes, in a chain form in which contact points, front, rear, left, and right sides, of each of the spheres abut each other with the spheres empressed eliminating gaps while the upper and lower spherical surfaces left intact so that the upper and lower spherical surfaces function as the spherical lenses. A shielding element serves as a spacer intervening between the pair of the complex spherical lenses and has light transmitting slits which receive each lens surface of the spherical lenses from the side corresponding thereto, positioning focuses of the spherical lenses on one side in the vicinity of the vertices of the lens surfaces of the spherical lenses on other side where the lens surfaces of the spherical lenses are received in the light transmitting slits.

Accordingly, in such a device for preventing a false lighting phenomenon, the directly radiated beam of the sun is at first refracted by each of the spherical lenses of the complex spherical lenses on the cover lens side (external side) even when it is incident upon them directly from the front, thus focusing the light in the light transmitting slits of the shielding element so that it is condensed to be extremely small, and then, refracted again by the spherical lenses of the complex spherical lenses on the light source side (internal side) of the signal lamp, resulting in the sun light entering in a state that it is diffused. In this way, since the sun light is incident in a diffused state, the reflected light is reduced when it is reflected in the signal lamps and emitted therefrom. At the same time, the reflected light is sufficiently cut off by cross bars of the shielding element. Therefore, the contrast of brightness becomes greater between the interior and exterior transmissions of the signal lamp. In this respect, there exists the sun light reflected on the outer surface of the complex spherical lenses on the outer side, though its surface reflection is extremely limited. However, there is no flat portion associated with the surface of the complex spherical lenses. The surface is a collective element of convex surfaces configured substantially hemispheric, hence making it possible to reflect it after being greatly diffused. As a result, its luminance is made extremely small.

On the other hand, when the light source is turned on in the signal lamp, the light beam from the light source is refracted by each of the spherical lenses of the complex spherical lenses on the internal side so that it is in focus in the light transmitting slits, thus being condensed to be extremely small. Then, the light beam is in a state that it is emitted while being refracted and expanded through each of the spherical lenses of the complex spherical lenses on the external side. As a result, it is possible to obtain good visibility from the outside without observing any shadow of the shielding element.

With respect to the light transmitting slits of a device for preventing a false lighting phenomenon of the kind, a slit size sufficient for three of the spherical lenses of the complex spherical lenses from its corresponding side, it is possible to obtain a sufficient preventive effect against a false lighting, while enhancing the brightness because the transmittance is increased when the signal lamps are turned on. This arrangement is preferable because the visibility is further improved.

Also, if the portions other than the light transmitting slits of the shielding element are cross bars and vertical bars with a central portion of the cross bars being perpendicular to the vertical bars, and the vertical and cross bars being disposed along the lens boundary sections of each spherical lens or the complex spherical lenses at the same time, it is possible for the cross bars to effect a sufficient shielding function and make its shadow almost invisible. Also, the strength of the shielding element is made greater by the presence of the vertical bars. Further, it the shielding element is formed of a plastic molding, not only is workability obtained, but also, its economy becomes significant because it can be made in a light weight. With a shielding element of the kind which is disposed between the complex spherical lenses and formed integrally with them, it is possible to obtain a strength sufficient to withstand a high temperature, and to prevent the focus of each spherical lens of the complex spherical lenses from deviating. Then, if the shielding element is colored black or the like or a mirror section is provided for the portions in the inner side of the light transmitting slits close to the light source in the signal lamp, it is possible to obtain the same effects as described above.

It is still further preferable in an embodiment of the invention to arrange a pair of complex sphere lenses so that the pair of them can be fixed to each other particularly in the central portion thereof because strength is enhanced in the central portion facing the light source of signal lamps where the temperature becomes highest.

In this respect, it is to be understood that the term "signal lamp" used in the specification and claims means not only a traffic signal lamp, but also a wider conception including aeronautical marker lights and the like.

DETAILED DESCRIPTION OF THE INVENTION

Hereinafter, the description will be made of the embodiments according to this invention with reference to the accompanying drawings.

Figure 1:
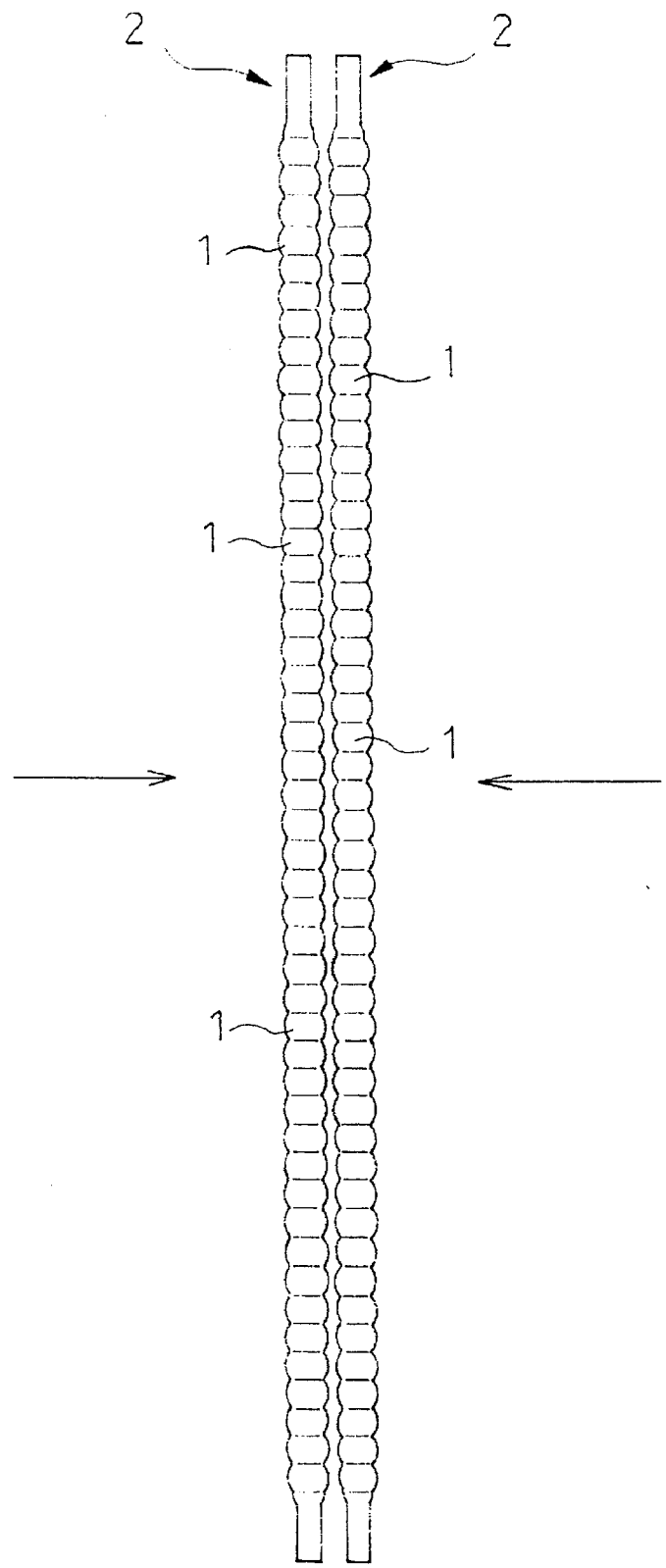
FIG. 1 is a side view showing the complex spherical lenses according to the invention.
Figure 2:
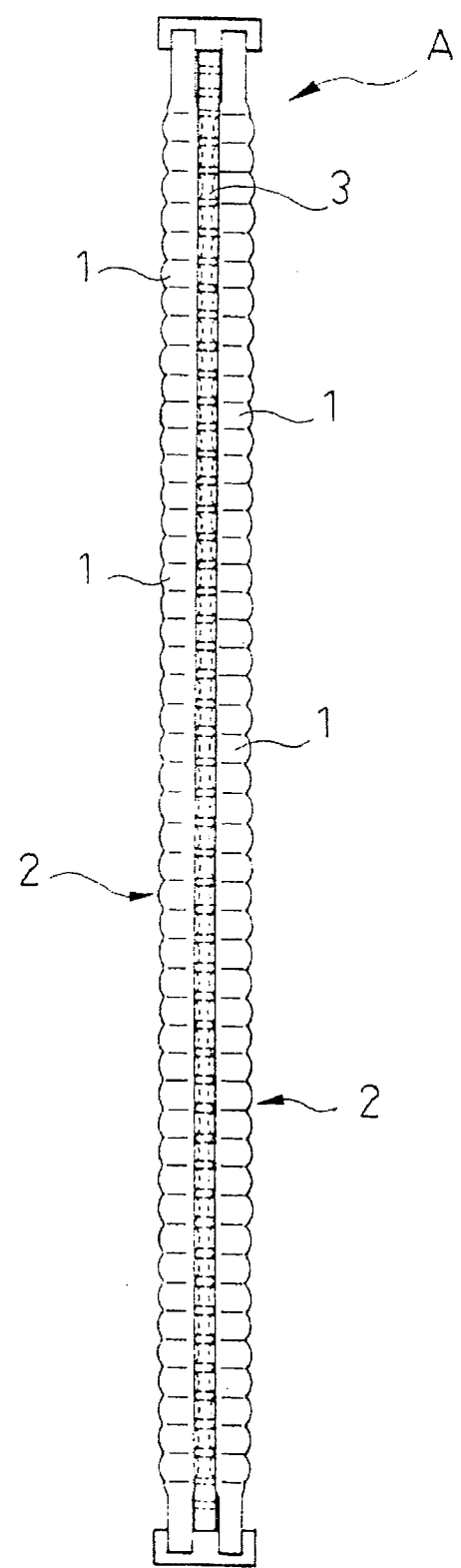
FIG. 2 is a side view showing a device for preventing a false lighting phenomenon according to a first embodiment of the invention.
Figure 3:
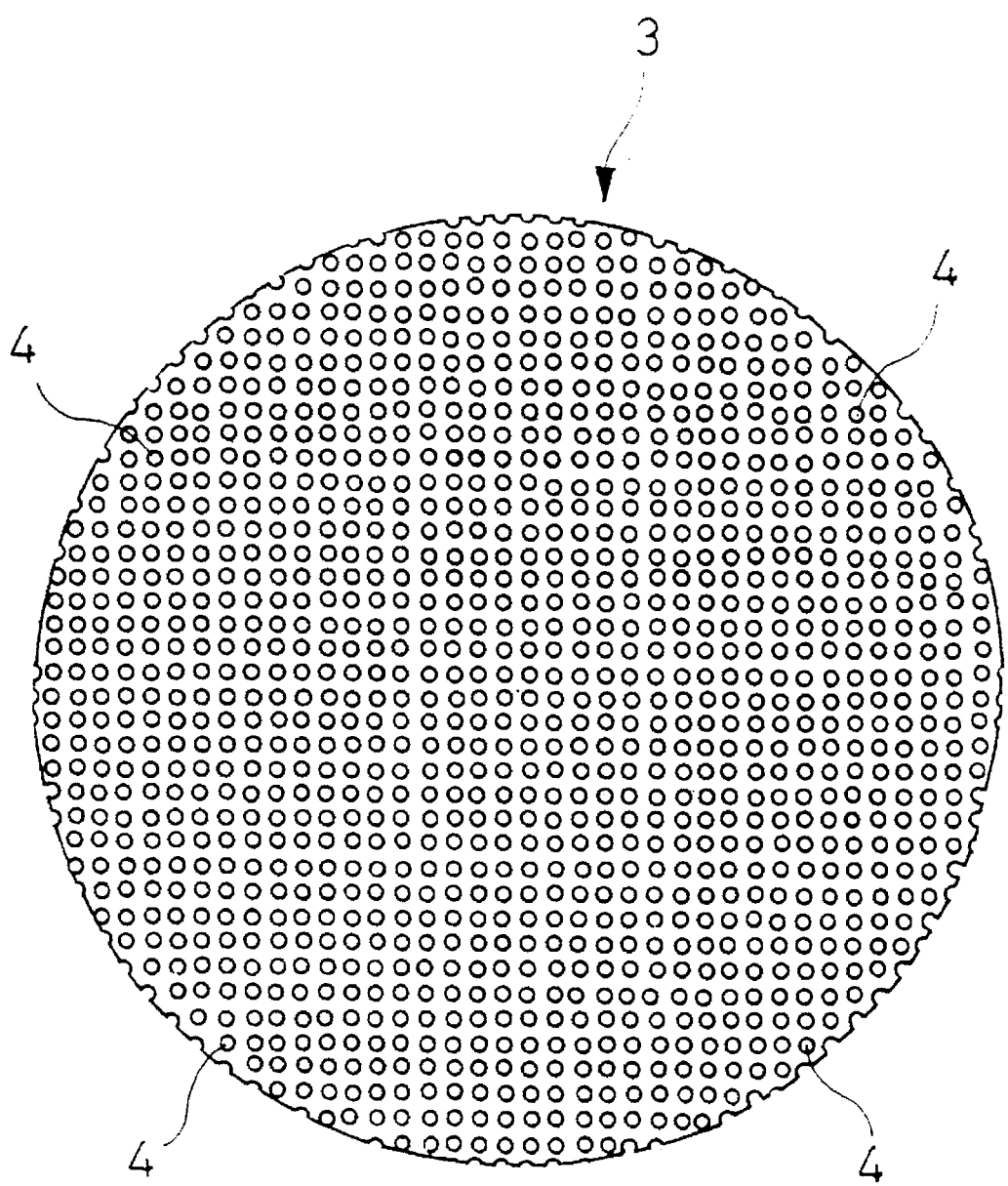
FIG. 3 is a plan view showing a shielding element according to the first embodiment of the invention.

Referring to FIGS. 1–3, a device A for preventing a false lighting phenomenon according to a first embodiment comprises a pair of complex spherical lenses 2 and 2 formed of an acrylic resin or a glass material wherein spheres are arranged in matrices on planes, and configured in a chain form in which the contact points, front, rear, left and right sides, of each of the spheres abut each other compressing the sphere to remove gaps while the upper and lower spherical surfaces are left intact so that the upper and lower spherical surfaces function as spherical lenses 1, 1. A shielding element 3, as shown in FIG. 3, and the complex spherical lenses 2 and 2 are arranged to face each other with the shielding element 3 intervening between them as shown in FIG. 2.

When observing the complex spherical lenses 2 in the vertical direction (in the direction indicated by arrows in FIG. 1), each of the spherical lenses 1, 1, . . . , are formed substantially square and are arranged in matrix without any gaps. Also, as a material for the complex spherical lenses 2, an acrylic resin or a glass material is suitable, but the material is not necessarily limited to either one of them. It may be possible to use some other materials having transmittance, such as materials usable for eye glasses, and or soft contact lenses.

The shielding element 3 is formed of a metal board in this embodiment, and as shown in FIG. 3, it is structured in such a manner that the light transmitting holes 4, 4, . . . have a substantially circular section and are made by punching at positions corresponding to each of the spherical lenses 1, 1, . . . . Surfaces other than the light transmitting holes 4, 4, . . . , and/or the inner face of the light transmitting holes 4, 4, . . . are colored in black.

Figure 4:
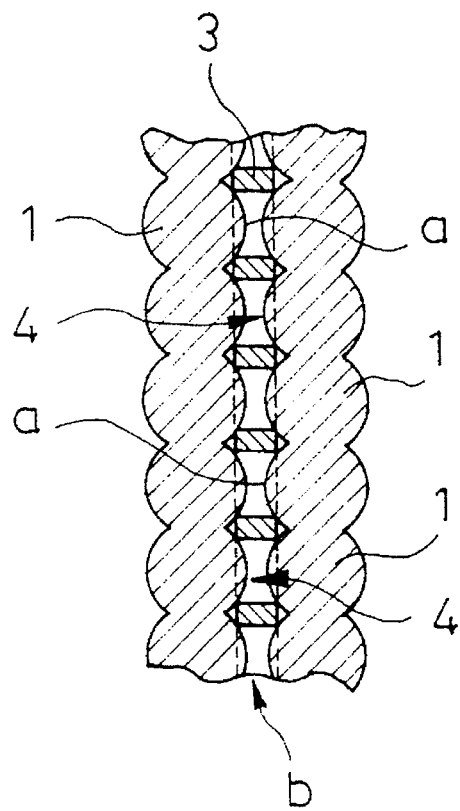
FIG. 4 is a cross-sectional view showing a principal part of the device for preventing a false lighting phenomenon according to the first embodiment of the invention.

Referring to FIG. 4, the lens surfaces a, a, . . . of the spherical lenses 1, 1, . . . are fitted into each of the light transmitting holes 4, 4, . . . from the corresponding sides, respectively, and the shielding element 3 is disposed between the complex spherical lenses 2 and 2 in a state that a specific fine space b is maintained between its vertices. In this way, the strength of the apparatus A for preventing a false lighting phenomenon is enhanced by allowing the shielding element 3 to intervene between the complex spherical lenses 2 and 2. At this time, the thickness of the shielding element 3 is adjusted so that the focus of each spherical lens 1 of the complex spherical lenses 2 on one side is positioned close to the vertex of the lens surface a of each spherical lens 1 on the other side in the space b. For example, the thickness is adjusted so that the space b is 1.3 to 1.4 mm when the radius of curvature of the lens surface a of the spherical lens 1 is 3.5 mm.

Figure 5:
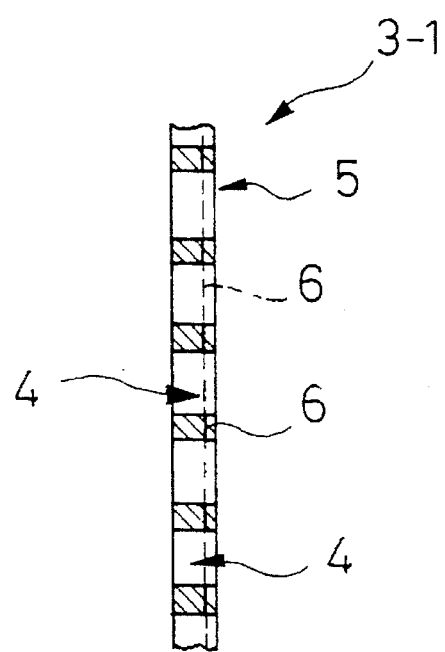
FIG. 5 is a cross-sectional view showing a shielding element according to a second embodiment or the invention.
Figure 6:
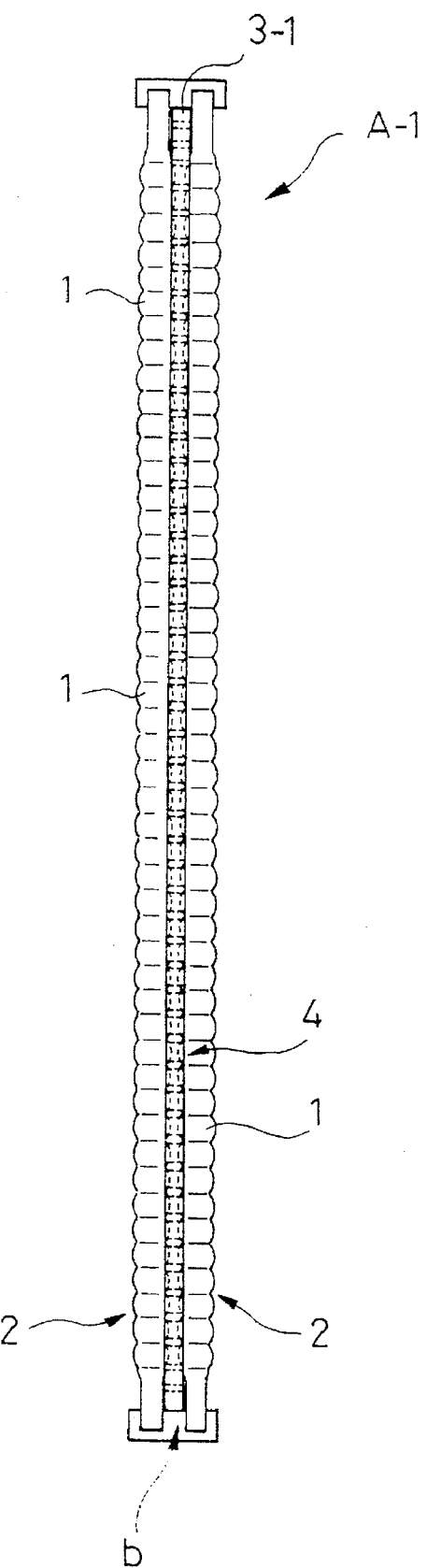
FIG. 6 is a side view showing the device for preventing a false lighting phenomenon according to the second embodiment of the invention.

Referring to FIGS. 5 and 6, a device A-1 for preventing a false lighting phenomenon according to a second embodiment is of such a structure that the external surface 5 of a shielding element 3-1 having the same configuration as that of the first embodiment is frosted in black, and at the same time, a mirror section 6 is formed in each of the inner side of the light transmitting holes 4, 4, . . . on the light source side of signal lamps as shown in FIG. 5. Then, as shown in FIG. 6, in each of the light transmitting holes 4, 4, . . . of the shielding element 3-1, the lens surfaces a, a, ... of the spherical lenses 1, 1, ... are fitted from the corresponding sides, respectively, and the shielding element 3-1 is disposed between the complex spherical lenses 2 and 2 in a state that a specific fine space b is maintained between its vertices in the same manner as in the first embodiment.

Figure 7:
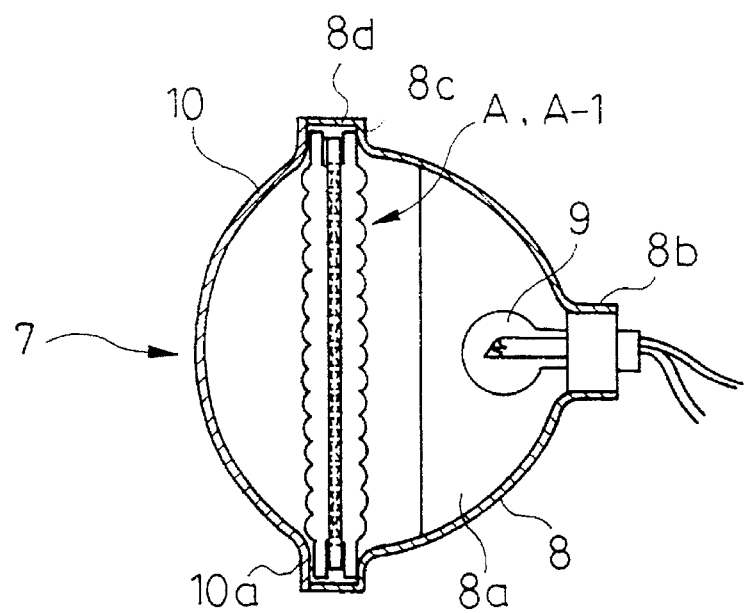
FIG. 7 is a partially sectional side view showing a main body of a signal lamp in which is installed the device for preventing a false lighting phenomenon according to the first and second embodiments of the invention.

Referring to FIG. 7, a main body 7 of signal lamps to which the device for preventing a false lighting phenomenon according to the above-mentioned first and second embodiments is installed is provided, as shown in FIG. 7, with a curved-face mirror 8 configured almost in the form of a bowl having a mirror portion 8a on the inner surface thereof, a light source 9 (using an electric bulb in this example) supported in a light source supporting section 8b provided in the center of the bottom of the curved-face mirror 8, and a cover lens 10.

The cover lens 10 is a lens each colored in red, blue, yellow, or others, respectively, in a case of signal lamps, for example. On the circumferential edge of the lens surface, a flange 10a is provided. A flange 8c, and a side wall 8d which is arranged substantially at right angle to the flange 8c are provided on an aperture end of the curved-face mirror. 8. A flange 10a of the cover lens 10 is fixed to the side wall 8d of the curved-face mirror 8 with the circumferential edge of the apparatus A or A-1 for preventing a false lighting phenomenon disposed between the flange 8c of the curved-face mirror 8 and the flange 10a of the cover lens 10. In this way, the apparatus A or A-1 for preventing a false lighting phenomenon is installed between the cover lens 10 and the light source 9.

Figure 8:
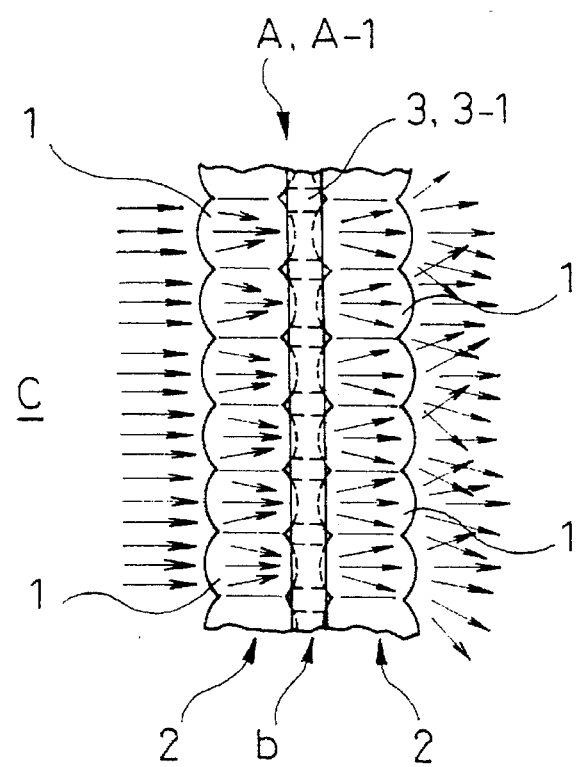
FIG. 8 is an explanatory view illustrating a state when the sun light is directly radiated on the device for preventing a false lighting phenomenon according to the first and second embodiments of the invention.

Referring the FIG. 8, transmission of light is described where the light of the rising sun, the setting sun, or other sun light radiates directly on the main body 7 of the signal lamp in which a device h or A-1 for preventing a false lighting phenomenon of the kind is installed. The sun light c incident upon the device h or A-1 for preventing a false lighting phenomenon is refracted by each of the spherical lenses 1, 1, ... of the complex spherical lenses 2 on the external side to focus in the space b so that it is condensed to be extremely small, and then, refracted again by each of the spherical lenses 1, 1, ... of the complex spherical lenses 2 on the internal side, thus being incident on the interior of the main body 7 of a signal lamp in a state that it is diffused. Since the sun light is incident in such a diffused state, the light reflected on and emitted from the mirror section 8a of the curved-face mirror 8 is reduced, and at the same time, the reflected light is cut off by the shielding element 3 or 3-1. Therefore, the brightness contrast between illumination from the interior of the main body 7 of the signal lamp and the exterior of the main body 7 of the signal lamp is great. In addition, there exists the sun light which is reflected on the outer surface of the complex spherical lenses 2 on the external side. However, the amount is extremely limited since there is no flat portion on the surface with respect to the complex spherical lenses 2. The surface is formed collectively by the convex surfaces of hemispheres. Consequently, the sun light is reflected greatly diffused, and its luminance is extremely small. Also, a light reflected on the surface of the kind is reduced in proportion to the radius of curvature of the lens surface of the spherical lenses 1. If such a surface reflection still presents a problem, the radius of curvature of the lens surface of the spherical lenses 1 should only be adjusted.

Figure 9:
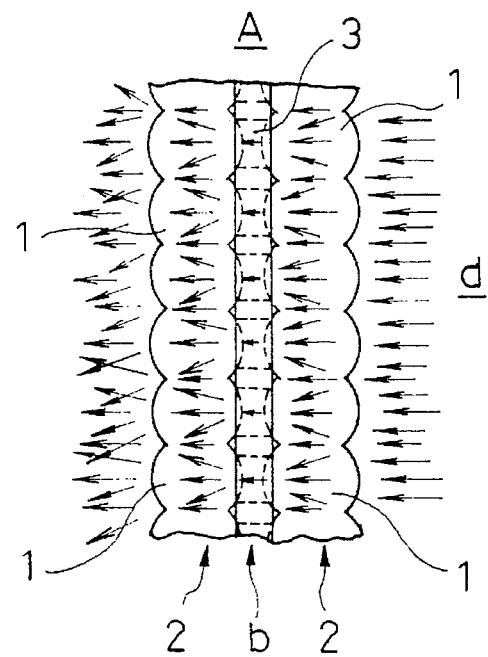
FIG. 9 is an explanatory view illustrating a state when the lights are turned on for the signal lamps provided with the device for preventing a false lighting phenomenon according to the first embodiment of the invention.

Referring to FIG. 9, when the light source 9 is turned on in the main body 7 of the signal lamp using the device A for preventing a false lighting phenomenon, the light beam d from the light source 9 is refracted in each of the spherical lenses 1, 1, ... of the complex spherical lenses 2 on the internal side to focus in the space b, thus being condensed to be extremely small. Then it is in a state of being emitted while it is refracted and expanded in each of the spherical lenses 1, 1, ... of the complex spherical lenses 2 on the external side. Therefore, it is possible to obtain good visibility without any shadow of the shielding element 3 being observed from the outside.

Figure 10:
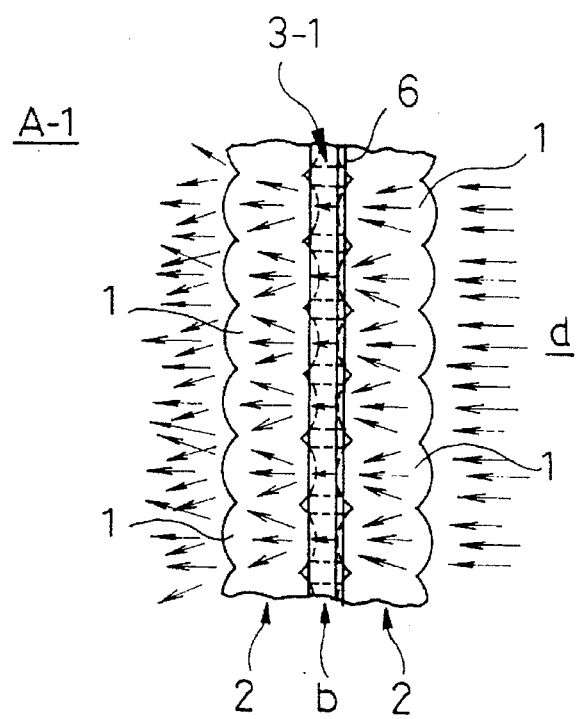
FIG. 10 is an explanatory view illustrating a state when the lamps are turned on for the signal lamps provided with the device for preventing a false lighting phenomenon according to the second embodiment of the invention.
Figure 11:
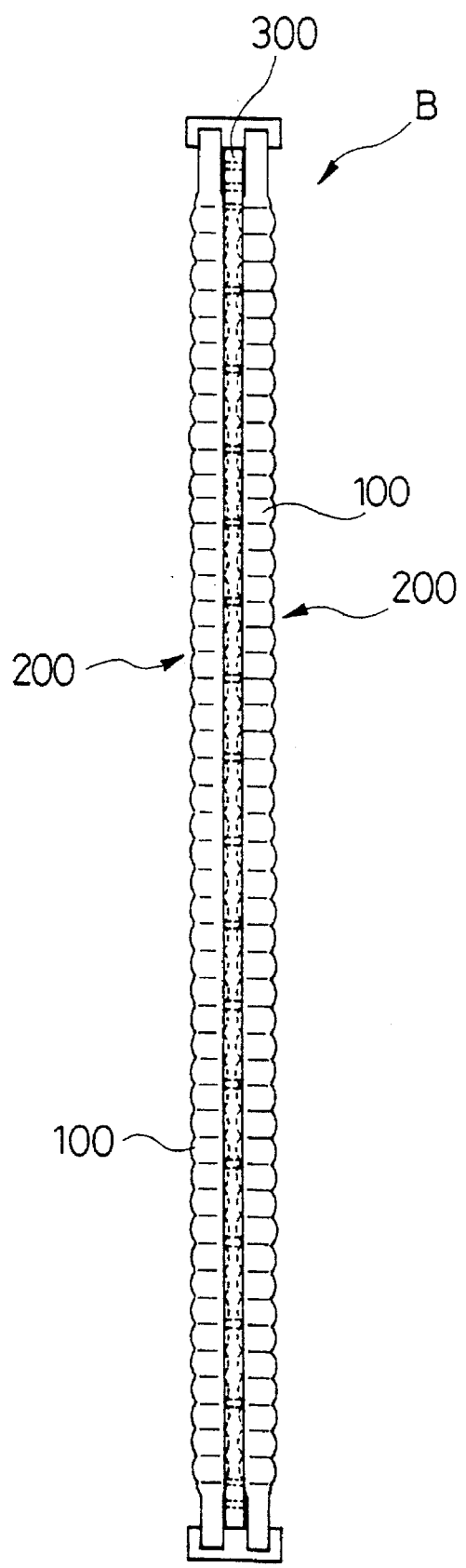
FIG. 11 is a side view showing a device for preventing a false lighting phenomenon according to a third embodiment of the invention.

Referring to FIG. 10, when the light source 9 is turned on in the main body 7 of signal lamps which uses the device A-1 for preventing a false lighting phenomenon, the light beam d from the light source 9 is refracted in each of the spherical lenses 1, 1, ... of the complex spherical lenses 2 on the internal side to focus in the space b, thus being condensed to be extremely small. Then, the light beam is in a state that it is emitted while being refracted in each of the spherical lenses 1, 1, ... of the complex spherical lenses 2 on the external side. Further in this case, the light beam d from the light source 9 is in a state that it is amplified by the reflection by the mirror section 6 formed in the shielding element 3-1 on the light source 9 side, and passes each of the light transmitting holes 4 of the shielding element 3-1. Also, compared to the case where no mirror section 6 is formed, the light beam is converged so that the visual angle can be controlled, hence making its use more convenient at an intersection having a narrower intersecting angles.

Referring to FIGS. 11 to 14, a device B for preventing a false lighting phenomenon according to a third embodiment comprises a pair of complex spherical lenses 200 and 200 formed by an acrylic resin or a glass material, and is of such a structure that spheres are arranged in matrices on planes, and configured in a chain form in which the contact points, front, rear, left and right sides, of each of the spheres abut each other and the spheres are compressed eliminating gaps while the upper and lower spherical surfaces and left intact so that the upper and lower spherical surfaces function as spherical lenses 100, 100, . . . . A shielding element 300, shown in FIG. 12, and the complex spherical lenses 200 and 200 are arranged to face each other with the shielding element 300 intervening between them.

When observing the complex spherical lenses 200 in the vertical direction (the same as in FIG. 1), each of the spherical lenses 100, 100, ... is formed substantially square is in outline and arranged in matrix without any gaps. Also, as a material for the complex spherical lenses 200, an acrylic resin or a glass material is suitable, but the material is not necessarily limited to either one of them. It may be possible to use some other materials having transmittance, such as materials usable for eye glasses, hard or soft contact lenses.

Figure 12:
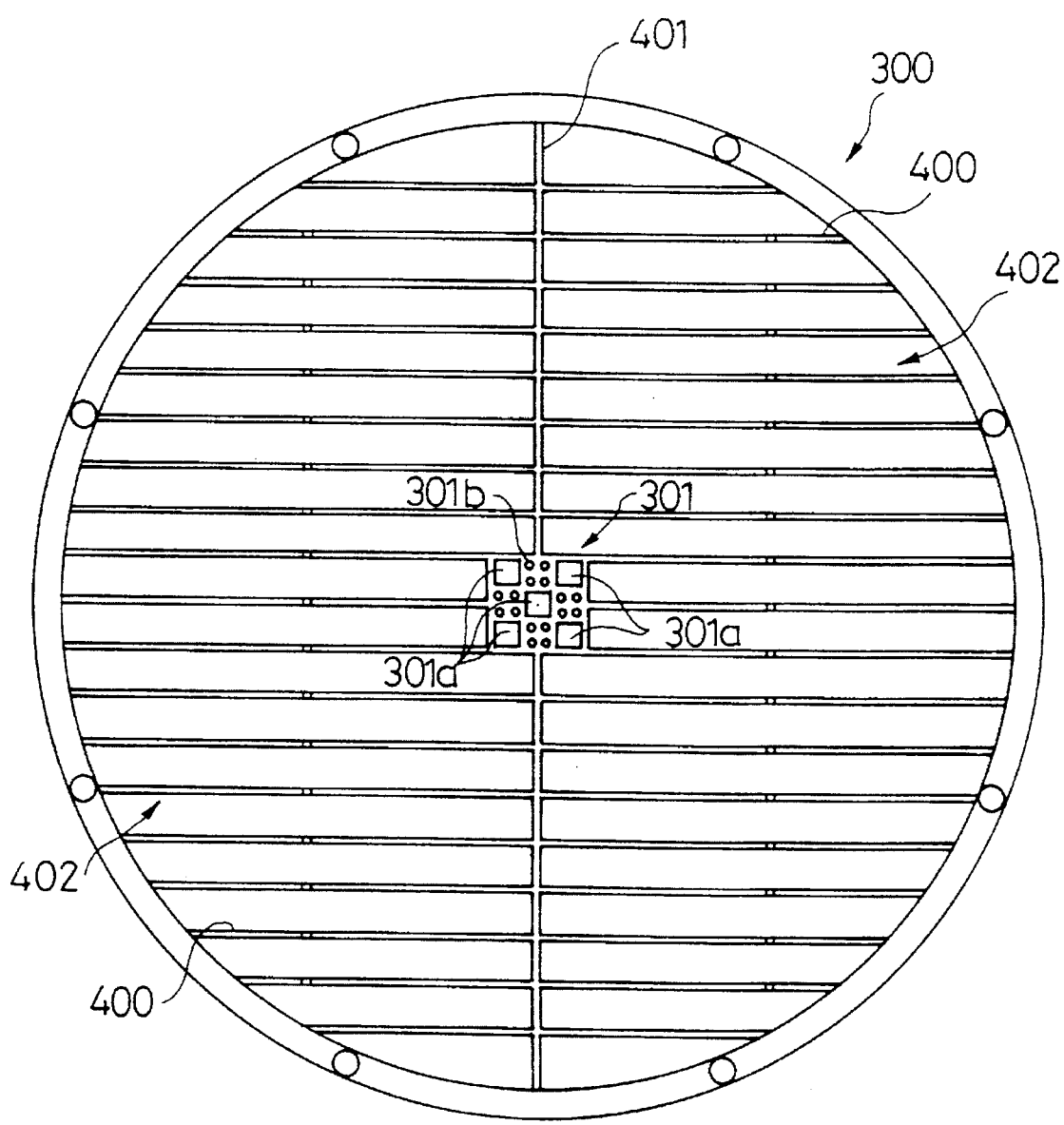
FIG. 12 is a plan view showing a shielding element according to the third embodiment or the invention.

The shielding element 300 is a molded product using plastic, and as shown in FIG. 12, it is structured in such a manner that the light transmitting slits 402, 402, ... are each sized to receive three lens surfaces of the spherical lenses 100, 100, ... and cross bars 400, 400, ... are formed in the positions corresponding to the lens boundary sections at intervals of three lens surfaces of the spherical lenses 100. The shielding element is colored black all over. Also, in this shielding element 300, a vertical bar 401 is provided perpendicular to the central part of each of the cross bars 400, 400, ... in order to enhance the strength of the shielding element. This vertical bar 400 is provided as reinforcing member so that the focus relations between each of the spherical lenses 100, 100, ... are more reliably prevented from being deviated due to the deformation of the device B for preventing a false lighting phenomenon by a high temperature when the light source is turned on in the main body of the signal lamp. In this respect, a vertical bar 401 of the kind is arranged in the positions corresponding to the lens boundary sections of each of the spherical lenses 100.

In a the central part of the shielding element 300, a fixture 301 is arranged. This fixture 301 is provided with five fixing holes 301a, 301a, corresponding to the lens boundaries of the spherical lenses 100, and through these fixing holes 301a, extruded male and female bosses (not shown) are arranged and positioned relative to each other on the boundary sections of the complex spherical lenses 200 and 200 to engage each other and be adhesively bonded for fixation. Further, on this fixture 301, a plurality of light transmitting holes 301b are arranged in the positions corresponding to the lens surfaces of the spherical lenses 100 so that the lens surfaces of the spherical lenses 100 can be inserted. In this way, the fixation is made in the central part of the complex spherical lenses 200, thus enhancing the strength of the central part which is heated to the highest temperature in a signal lamp when the light source is turned on.

Figure 13:
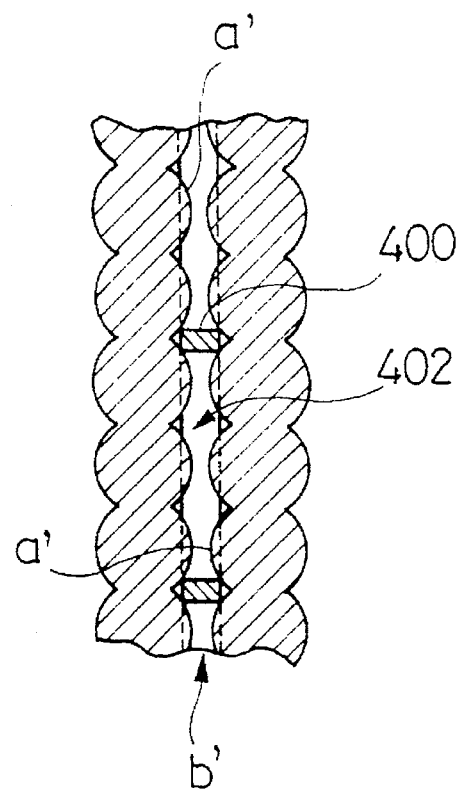
FIG. 13 is a cross-sectional view showing a principal part of the device for preventing a false lighting phenomenon according to the third embodiment of the invention.

As shown in FIG. 13, three each of the lens surfaces a', a', . . . of the spherical lenses 100, 100, . . . are fitted into each of the light transmitting slits 402, 402, . . . from the corresponding side, respectively, and the shielding element 300 is disposed between the complex spherical lenses 200 and 200 in a state that a specific fine space b' is maintained between its vertices. In this way, the strength of the device B for preventing a false lighting phenomenon is enhanced by arranging the shielding element 300 to intervene between the complex spherical lenses 200 and 200. At this time, the thickness of the shielding element 3 is adjusted so that the focus of each spherical lens 100 of the complex spherical lenses 200 on one side is positioned close to the vertex of the lens surface a of the spherical lens 100 on the other side in the space b'. For example, the thickness of the shielding element 300 is adjusted so that the space b' is 1.3 to 1.4 mm when the radius of curvature of the lens surface a' of the spherical lens 100 is 3.5 mm.

Figure 14:
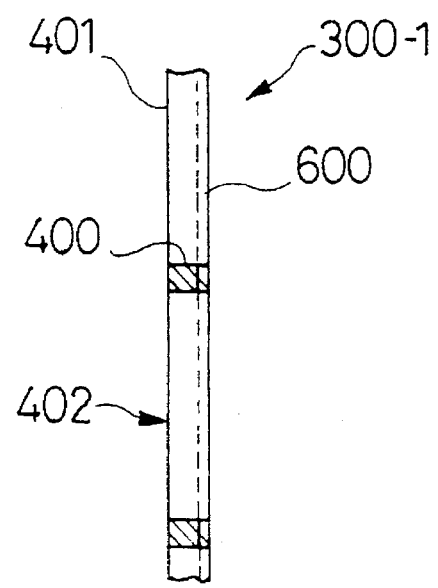
FIG. 14 is a cross-sectional view showing a principal part of a shielding element according to a fourth embodiment of the invention.
Figure 15:
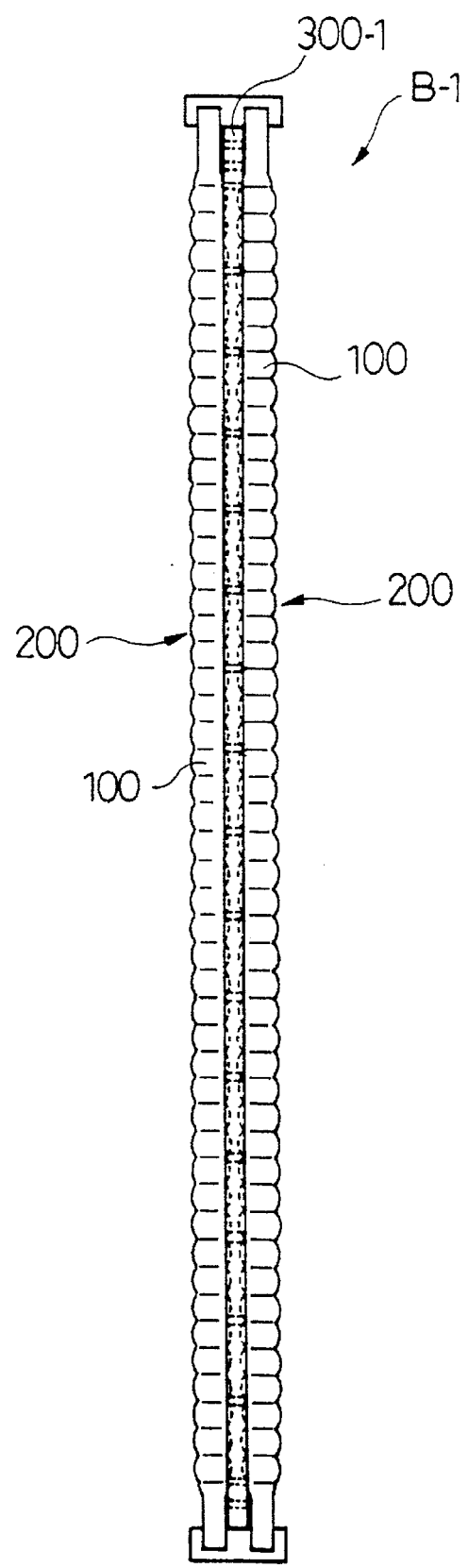
FIG. 15 is a side view showing a device for preventing a false lighting phenomenon according to the fourth embodiment of the invention.

Referring to FIGS. 14 and 15, a device B-1 for preventing a false lighting phenomenon according to a fourth embodiment is shown having, mirror sections 600 arranged at intervals of approximately ⅓ of the thickness from the light source side of the signal lamp in the inner face of each of the light transmitting slits 402, 402, . . . of a shielding element 300-1 having the same configuration of that in the third embodiment. Then, as shown in FIG. 15, three each of the lens surfaces a', a', . . . of the spherical lenses 100, 100, . . . are fitted into each of the light transmitting slits 402, 402, . . . of the shielding element 300-1 from the corresponding side, respectively, and the shielding element 300-1 is disposed between the complex spherical lenses 200 and 200 in a state that a specific fine space b' is maintained between its vertices in the same manner as in the third embodiment.

Figure 16:
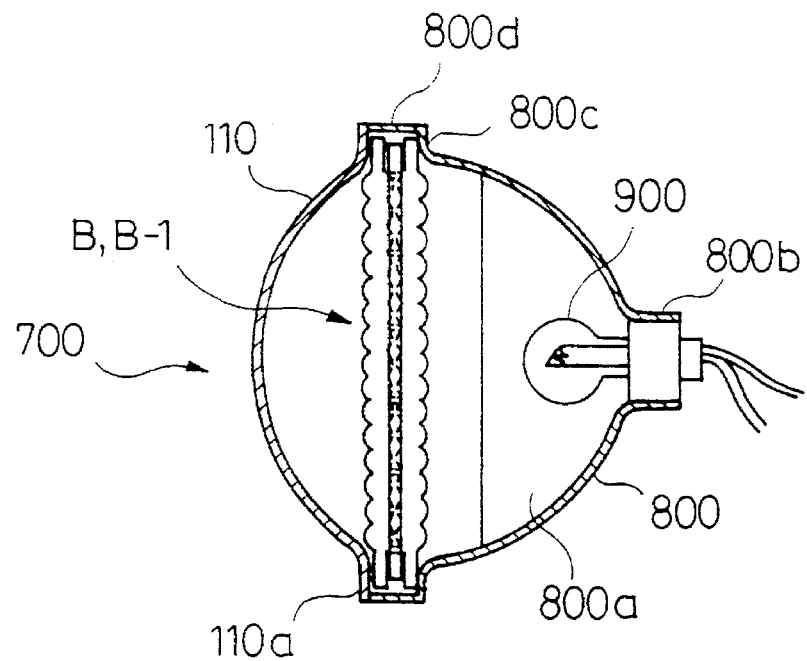
FIG. 16 is a partially sectional side view showing a main body of the signal lamp in which is installed the device for preventing a false lighting phenomenon according to the third and fourth embodiments of the invention.

Referring to FIG. 16, a main body 700 of a signal lamp having the device for preventing a false lighting phenomenon according to the above-mentioned third and fourth embodiments installed includes a curved-face mirror 800 configured almost in the form of a bowl having a mirror portion 800a on the inner surface thereof, a light source 900 (using an electric bulb in this example) supported in a light source supporting section 800b provided in the center of the bottom of the curved-face mirror 800, and a cover lens 110.

The cover lens 110 is the same as the one used for the above-mentioned embodiment. On the circumferential edge of the lens surface, a flange 110a is provided. A flange 800c, and the side wall 800d substantially perpendicular to the flange 800c are provided on an aperture end of the curved-face mirror 800. Then the flange 110a of the cover lens 100 is fixed to the side wall 800d of the curved-face mirror 800 while the circumferential edge of the device B or B-1 for preventing a false lighting phenomenon is disposed between the flange 800c of the curved-face mirror 800 and the flange 110a of the cover lens 110. In this way, the device B or B-1 for preventing a false lighting phenomenon is installed between the cover lens 110 and the light source 900. In this respect, the traffic signal lamps are often installed in a position which is usually looked up from the lower direction. For such a use, therefore, the device B or B-1 for preventing a false lighting phenomenon should preferably be inclined downward at a specific angle in relation to the installation height of the signal lamps. Thus the light beam emitted from the light source 900 in the way which will be described later is in a state that it has the optical axis close to the line of sight to make the visibility more enhanced. On the other hand, the sun light is diffused as described later, and at the same time, reflected by the curved-face mirror 800 in a state that it is incident upon the mirror diagonally. As a result, it is projected above and below the interior of the main body 700 of a signal lamp, thus making it difficult for the reflected light of the sun light to appear directly on the complex spherical lenses 200. Hence the prevention of a false lighting phenomenon can be carried out more reliably (this is also applicable to the above-mentioned first and second embodiments).

Figure 17:
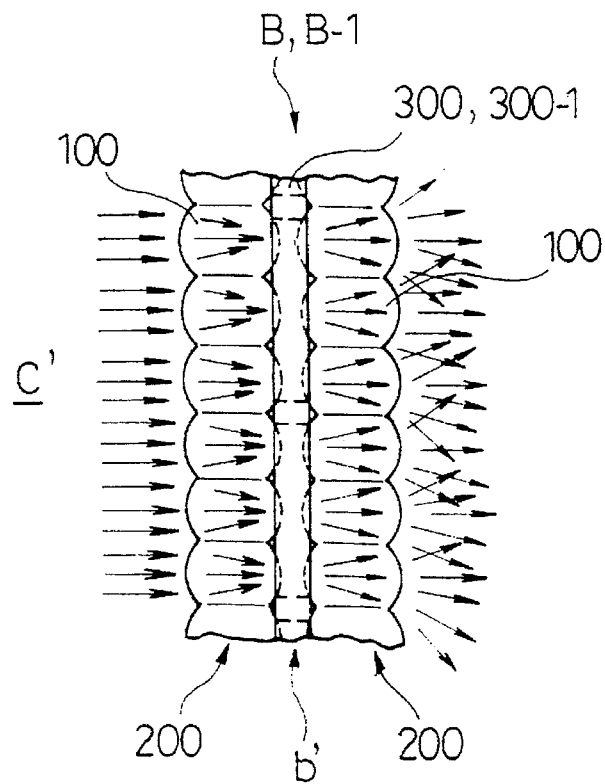
FIG. 17 is an explanatory view illustrating a state when the sun light is directly radiated on the device for preventing a false lighting phenomenon according to the third and fourth embodiments of the invention.

Referring to FIG. 17, a description will be made of such a case where the light of the rising sun, the setting sun, or other sun light radiates directly on the main body 7 of a signal lamp in which a device B or B-1 for preventing a false lighting phenomenon of the kind is installed. The sun light c' incident upon the device B or B-1 for preventing a false lighting phenomenon is refracted by each of the spherical lenses 100, 100, . . . of the complex spherical lenses 200 on the external side to focus in the space b' so that it is condensed to be extremely small, and then, refracted again by each of the spherical lenses 100, 100, . . . of the complex spherical lenses 200 on the internal side, thus being incident on the interior of the main body 700 of a signal lamp in a state that it is diffused. Since the sun light is incident in such a diffused state as this, the light reflected on and emitted from the mirror section 800a of the curved-face mirror 800 is reduced, and at the same time, the reflected light is cut off by the cross bars 400 of the shielding element 300 or 300-1. Therefore, the brightness contrast between illumination from the interior of the main body 700 of a signal lamp and the exterior of the main body 700 of a signal lamp is great. In addition, there exists the sun light which is reflected on the outer surface of the complex spherical lenses 200 on the external side. However, the amount is extremely limited since there is no flat portion on the surface with respect to the complex spherical lenses 200. The surface is formed collectively by the convex surfaces of hemispheres. Consequently, the sun light is reflected while being diffused greatly, and its luminance is extremely small. Also, a light reflected on such surface of the kind is reduced in proportion to the radius of curvature of the lens surface of the spherical lenses 100. If such a surface reflection still presents a problem, the radius of curvature of the lens surface of the spherical lenses 100 should only be adjusted.

Figure 18:
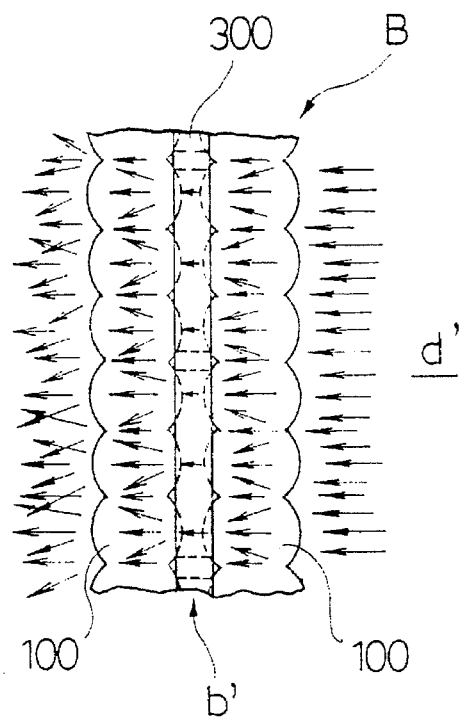
FIG. 18 is an explanatory view illustrating a state when the lights are turned on for the signal lamps provided with the device for preventing a false lighting phenomenon according to the third embodiment of the invention.

Referring to FIG. 18, in contract to the above, when the light source 900 is turned on in the main body 700 of a signal lamp using the device B for preventing a false lighting phenomenon the light beam d' from the light source 900 is refracted in each of the spherical lenses 100, 100, . . . of the complex spherical lenses 200 on the internal side to focus in the space b', thus being condensed to be extremely small.

Then it is in a state of being emitted while it is refracted and expanded in each of the spherical lenses 100, 100, ... of the complex spherical lenses 200 on the external side. Therefore, it is possible to obtain good visibility without any shadow of the cross bars 400 of the shielding element 300 being observed from the outside.

Figure 19:
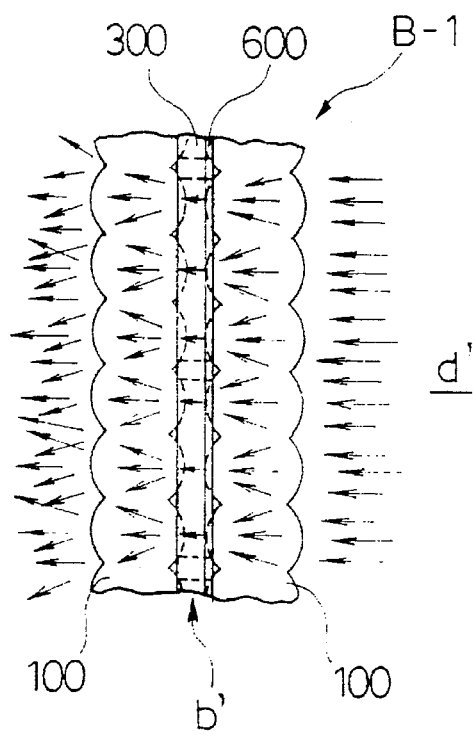
FIG. 19 is an explanatory view illustrating a state when the lights are turned on for the signal lamps provided with the device for preventing a false lighting phenomenon according to the fourth embodiment of this invention.

Referring to FIG. 19, when the light source 900 is turned on in the main body 700 of a signal lamp using the device B-1 for preventing a false lighting phenomenon, the light beam d' from the light source 900 is refracted in each of the spherical lenses 100, 100, ... of the complex spherical lenses 200 on the internal side to focus in the space b', thus being condensed to be extremely small. Then the light beam is in a state that it is emitted while being refracted in each of the spherical lenses 100, 100, ... of the complex spherical lenses 200 on the external side. Further in this case, the light beam d' from the light source 900 is in a state that it is amplified by the reflection by the mirror section 600 formed in the shielding element 300-1 on the light source 900 side, and passes each of the light transmitting slits 402 of the shielding element 300-1. Also, compared to the case where no mirror section 600 is formed, the light beam is converged so that the visual angle can be controlled, hence making its use more convenient at an intersection having narrow intersecting angles.

As described above, while a device for preventing a false lighting phenomenon according to this invention is capable of effectively preventing a false lighting phenomenon from taking place, it can maintain the visibility as in the conventional art when signal lamps are turned on. Therefore, the apparatus is remarkably suitable for use as traffic lights, aeronautical marker lights, and the like, and is capable of contributing to the provision of a higher safety in the traffics, aviation, and the like.

What is claimed is:

1. A device for preventing a false lighting phenomenon provided between a light source of a main body of a signal lamp and a cover lens, the device comprising:

a pair of complex spherical lenses each formed of spheres arranged in a planar matrix, said spheres being truncated to have a substantially square outline in said planar matrix allowing said spheres to form lines of continuous contact with each other along front, rear, left and right sides of each of the spheres thereby eliminating gaps between said spheres;

said spheres having first and second spherical lens surfaces on opposing sides of said complex spherical lenses forming spherical lenses;

a shielding element interposed between said pair of complex spherical lenses and having light transmitting slits for supportively receiving adjacent ones of said spherical lens surfaces of said spherical lenses; and said shielding element having a thickness for functioning as a spacer to position focal points of said spherical lenses on one side of said shielding element proximate corresponding vertices of the spherical lenses on an opposite side of said shielding element.

2. The device for preventing a false lighting phenomenon according to any of claim 1, wherein said shielding element is colored in shades of black.

3. The device for preventing a false lighting phenomenon according to claim 1, wherein said shielding element is provided with a mirror section on an inner side portion of the light transmitting slits proximate said light source.

4. The device for preventing a false lighting phenomenon according to claim 1, wherein said pair of complex spherical lenses are arranged to be fixed to each other at least in a central part thereof.

5. The device for preventing a false lighting phenomenon according to claim 1, wherein said complex spherical lenses are formed of one of an acrylic resin and a glass material.

6. The device for preventing a false lighting phenomenon according to claim 1, wherein said shielding element is formed of a molded plastic.

7. The device for preventing a false lighting phenomenon according to claim 3, wherein said pair of complex spherical lenses are arranged to be fixed to each other at least in a central part thereof.

8. The device for preventing a false lighting phenomenon according to claim 3, wherein said complex spherical lenses are formed of one of an acrylic resin and a glass material.

9. The device for preventing a false lighting phenomenon according to claim 3, wherein said shielding element is formed of a molded plastic.

10. The device for preventing a false lighting phenomenon according to claim 4, wherein said complex spherical lenses are formed of one of an acrylic resin and a glass material.

11. The device for preventing a false lighting phenomenon according to claim 4 wherein said shielding element is formed of a molded plastic.

12. The device for preventing a false lighting phenomenon according to claim 5, wherein said shielding element is formed of a molded plastic.

13. A device for preventing a false lighting phenomenon provided between a light source of a main body of a signal lamp and a cover lens, the device comprising:

a pair of complex spherical lenses each formed of spheres arranged in a planar matrix, said spheres being truncated to have a substantially square outline in said planar matrix allowing said spheres to form lines of continuous contact with each other along front, rear, left and right sides of each of the spheres thereby eliminating gaps between said spheres;

said spheres having first and second spherical lens surfaces on opposing sides of said complex spherical lenses forming spherical lenses;

a shielding element interposed between said pair of complex spherical lenses and having light transmitting slits for supportively receiving adjacent ones of said spherical lens surfaces of said spherical lenses;

said shielding element having a thickness for positioning focal points of said spherical lenses on one side of said shielding element proximate corresponding vertices of the spherical lenses on an opposite side of said shielding element; and each of the light transmitting slits of said shielding element receiving three spherical lenses of the complex spherical lenses from the corresponding side.

14. The device for preventing a false lighting phenomenon according to claim 13, wherein the light transmitting slits of said shielding element define cross bars and at least one vertical bar, the at least one vertical bar intersects central parts of the cross bars, and the at least one vertical bar and the cross bars are disposed to interface with lens boundaries of the spherical lenses of said complex spherical lenses.

15. The device for preventing a false lighting phenomenon according to claim 13, wherein said shielding element is colored in shades of black.

16. The device for preventing a false lighting phenomenon according to claim 13, wherein said shielding element is provided with a mirror section on an inner side portion of the light transmitting slits proximate said light source.

17. The device for preventing a false lighting phenomenon according to claim 13, wherein said pair of complex spherical lenses are arranged to be fixed to each other at least in a central part thereof.

18. The device for preventing a false lighting phenomenon according to claim 13, wherein said complex spherical lenses are formed of one of an acrylic resin and a glass material.

19. The device for preventing a false lighting phenomenon according to claim 13, wherein said shielding element is formed of a molded plastic.

20. A device for preventing a false lighting phenomenon provided between a light source of a main body of a signal lamp and a cover lens, the device comprising:

a pair of complex spherical lenses each formed of spheres arranged in a planar matrix, said spheres being truncated to have a substantially square outline in said planar matrix allowing said spheres to form lines of continuous contact with each other along front, rear, left and right sides of each of the spheres thereby eliminating gaps between said spheres;

said spheres having first and second spherical lens surfaces on opposing sides of said complex spherical lenses forming spherical lenses;

a shielding element interposed between said pair of complex spherical lenses and having light transmitting slits for supportively receiving adjacent ones of said spherical lens surfaces of said spherical lenses;

said shielding element having a thickness for positioning focal points of said spherical lenses on one side of said shielding element proximate corresponding vertices of the spherical lenses on an opposite side of said shielding element; and the light transmitting slits of said shielding element defining cross bars and at least one vertical bar, the at least one vertical bar intersecting central parts of the cross bars, and the at least one vertical bar and the cross bars being disposed to interface with lens boundaries of the spherical lenses of said complex spherical lenses.

21. The device for preventing a false lighting phenomenon according to claim 20, wherein said shielding element is colored in shades of black.

22. The device for preventing a false lighting phenomenon according to claim 20, wherein said shielding element is provided with a mirror section on an inner side portion of the light transmitting slits proximate said light source.

23. The device for preventing a false lighting phenomenon according to claim 2, wherein said shielding element is provided with a mirror section on an inner side portion of the light transmitting slits proximate said light source.

24. The device for preventing a false lighting phenomenon according to claim 20, wherein said pair of complex spherical lenses are arranged to be fixed to each other at least in a central part thereof.

25. The device for preventing a false lighting phenomenon according to claim 2, wherein said pair of complex spherical lenses are arranged to be fixed to each other at least in a central part thereof.

26. The device for preventing a false lighting phenomenon according to claim 20, wherein said complex spherical lenses are formed of one of an acrylic resin and a glass material.

27. The device for preventing a false lighting phenomenon according to claim 2, wherein said complex spherical lenses are formed of one of an acrylic resin and a glass material.

28. The device for preventing a false lighting phenomenon according to claim 20, wherein said shielding element is formed of a molded plastic.

29. The device for preventing a false lighting phenomenon according to claim 2, wherein said shielding element is formed of a molded plastic.

30. A device for preventing a false lighting phenomenon provided between a light source of a main body of a signal lamp and a cover lens, the device comprising:

a pair of complex spherical lenses each formed of spheres arranged in a planar matrix, said spheres being truncated to have a substantially square outline in said planar matrix allowing said spheres to form lines of continuous contact with each other along front, rear, left and right sides of each of the spheres thereby eliminating gaps between said spheres;

said spheres having first and second spherical lens surfaces on opposing sides of said complex spherical lenses forming spherical lenses;

a shielding element interposed between said pair of complex spherical lenses and having light transmitting slits, each of said light transmitting slits supportively receiving a line of said spherical lens surfaces of said spherical lenses in said planar matrix; and said shielding element functioning as a spacer for positioning focal points of said spherical lenses on one side of said shielding element proximate corresponding vertices of the spherical lenses on an opposite side of said shielding element.

31. The device for preventing a false lighting phenomenon according to claim 30, wherein the light transmitting slits of said shielding element define cross bars and at least one vertical bar, the at least one vertical bar intersects central parts of the cross bars, and the at least one vertical bar and the cross bars are disposed to interface with lens boundaries of the spherical lenses of said complex spherical lenses.

32. The device for preventing a false lighting phenomenon according to claim 30, wherein said shielding element is colored in shades of black.

33. The device for preventing a false lighting phenomenon according to claim 30, wherein said shielding element is provided with a mirror section on an inner side portion of the light transmitting slits proximate said light source.

34. The device for preventing a false lighting phenomenon according to claim 30, wherein said pair of complex spherical lenses are arranged to be fixed to each other at least in a central part thereof.

35. The device for preventing a false lighting phenomenon according to claim 30, wherein said complex spherical lenses are formed of one of an acrylic resin and a glass material.

36. The device for preventing a false lighting phenomenon according to claim 30, wherein said shielding element is formed of a molded plastic.

37. A device for preventing a false lighting phenomenon provided between a light source of a main body of a signal lamp and a cover lens, the device comprising:

a pair of complex spherical lenses each formed of spheres arranged in a planar matrix, said spheres being truncated to have a substantially square outline in said planar matrix allowing said spheres to form lines of continuous contact with each other along front, rear, left and right sides of each of the spheres thereby eliminating gaps between said spheres;

said spheres having first and second spherical lens surfaces on opposing sides of said complex spherical lenses forming spherical lenses;

a shielding element interposed between said pair of complex spherical lenses and having light transmitting slits, each of said light transmitting slits supportively receiving a plurality of lines of said spherical lens surfaces of said spherical lenses in said planar matrix; and said shielding element functioning as a spacer for positioning focal points of said spherical lenses On one side of said shielding element proximate corresponding vertices of the spherical lenses on an opposite side of said shielding element.

38. The device for preventing a false lighting phenomenon according to claim 37, wherein the light transmitting slits of said shielding element define cross bars and at least one vertical bar, the at least one vertical bar intersects central parts of the cross bars, and the at least one vertical bar and the cross bars are disposed to interface with lens boundaries of the spherical lenses of said complex spherical lenses.

39. The device for preventing a false lighting phenomenon according to claim 37, wherein said shielding element is colored in shades of black.

40. The device for preventing a false lighting phenomenon according to claim 37, wherein said shielding element is provided with a mirror section on an inner side portion of the light transmitting slits proximate said light source.

41. The device for preventing a false lighting phenomenon according to claim 37, wherein said pair of complex spherical lenses are arranged to be fixed to each other at least in a central part thereof.

42. The device for preventing a false lighting phenomenon according to claim 37, wherein said complex spherical lenses are formed of one of an acrylic resin and a glass material.

43. The device for preventing a false lighting phenomenon according to claim 37, wherein said shielding element is formed of a molded plastic.

44. A signal lamp comprising:

a main body forming a reflective lens and having a projecting aperture and a light source disposed proximate a focal point of the reflective lens;

a cover lens covering said projecting aperture; and a planar lens assembly disposed between said light source and said cover lens, said planar lens assembly comprising:

a pair of complex spherical lenses each formed of spheres arranged in a planar matrix, said spheres being truncated to have a substantially square outline in said planar matrix allowing said spheres to form lines of continuous contact with each other along front, rear, left and right sides of each of the spheres thereby eliminating gaps between said spheres;

said spheres having first and second spherical lens surfaces on opposing sides of said complex spherical lenses forming spherical lenses;

a shielding element interposed between said pair of complex spherical lenses and having light transmitting slits, each of said light transmitting slits supportively receiving a line of said spherical lens surfaces of said spherical lenses in said planar matrix; and said shielding element functioning as a spacer for positioning focal points of said spherical lenses on one side of said shielding element proximate corresponding vertices of the spherical lenses on an opposite side of said shielding element.

45. A method of preventing false lighting phenomena in a signal lamp having a main body forming a reflective lens and having a projecting aperture, a light source disposed proximate a focal point of the reflective lens, and a cover lens covering said projecting aperture, the method comprising the steps of:

forming a pair of complex spherical lenses each having spheres arranged in a planar matrix, said spheres being truncated to have a substantially square outline in said planar matrix allowing said spheres to form lines of continuous contact with each other along front, rear, left and right sides of each of the spheres thereby eliminating gaps between said spheres, and said spheres having first and second spherical lens surfaces on opposing sides of said complex spherical lenses forming spherical lenses;

interposing a shielding element between said pair of complex spherical lenses and having light transmitting slits;

fixing together said complex spherical lenses with said shielding element to form a spherical lens assembly with each of said light transmitting slits supportively receiving a line of said spherical lens surfaces of said spherical lenses;

dimensioning said shielding element to function as a spacer for positioning focal points of said spherical lenses on one side of said shielding element proximate corresponding vertices of the spherical lenses on an opposite side of said shielding element; and disposing said spherical lens assembly between said light source and said cover lens.

* * * * *